Sept. 18, 1962  A. S. ANDERSON  3,054,462
LOAD TRANSFER DEVICE FOR CULTIVATORS
Filed Sept. 12, 1960  2 Sheets-Sheet 1

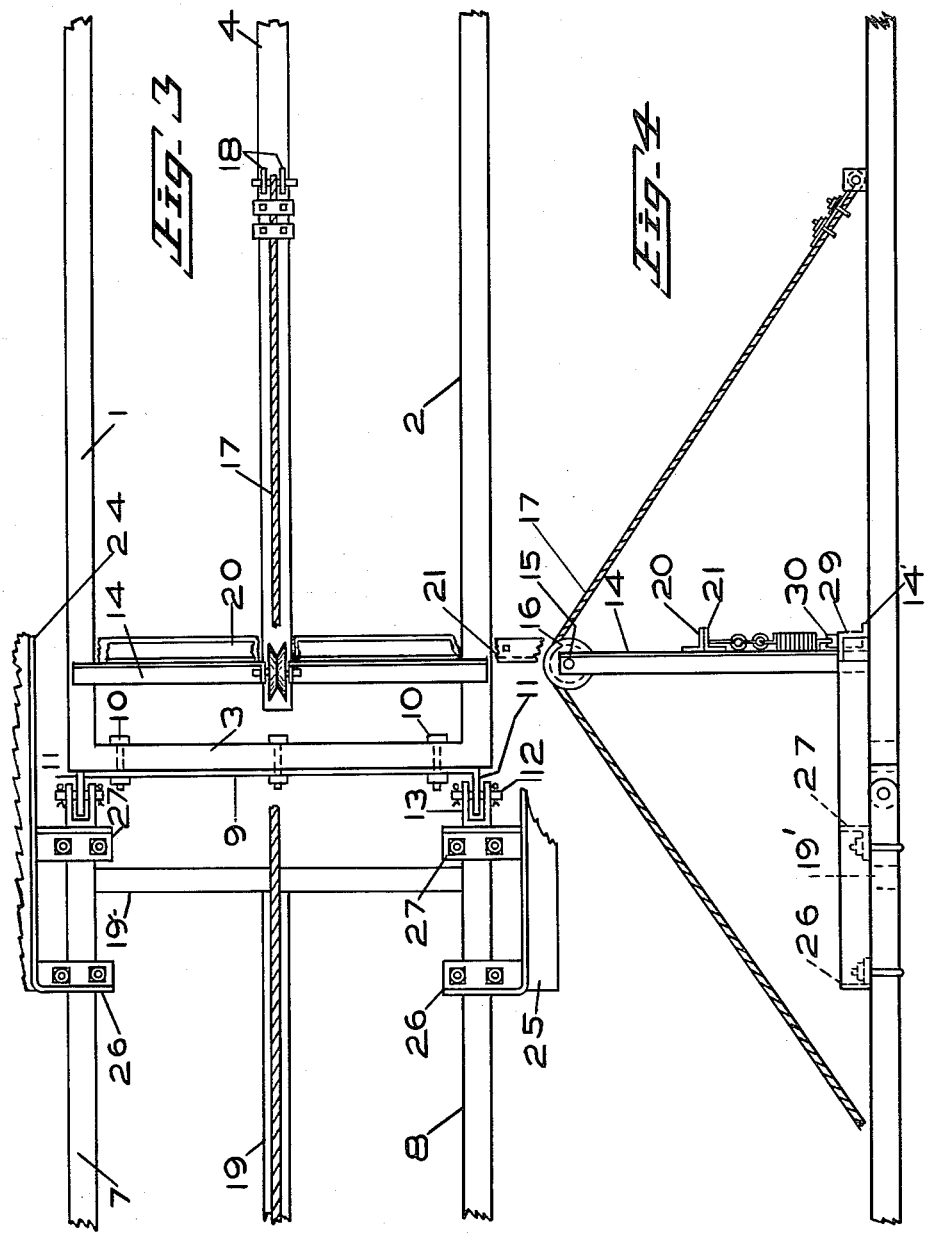

United States Patent Office 3,054,462
Patented Sept. 18, 1962

3,054,462
LOAD TRANSFER DEVICE FOR CULTIVATORS
Anders Sigfrid Anderson, Box 707, Regina,
Saskatchewan, Canada
Filed Sept. 12, 1960, Ser. No. 55,283
1 Claim. (Cl. 172—629)

This invention relates to cultivating implements, having reference to a load transfer attachment for use on cultivating sections pivotally connected for travel in line.

In the art to which the invention relates cultivator sections may be pivotally connected for travel in line as a unit. The center section of a three section assembly such as this penetrates too deeply, resulting in uneven tillage and increased draft.

The present device is designed to overcome this by provision of a transfer attachment between the center and wing sections of a three section assembly by which the load is transferred from the center section to the wing sections. For this tensionable elements, preferably springs, are mounted to be tensioned by excessive soil penetration by the center section and to transfer the weight of the section to the wing sections.

In the drawings, illustrating a preferred embodiment of the invention.

FIG. 3 is a top plan view showing in part the center section frame and a wing section frame, and including the load transfer bars, shown with parts broken away.

FIG. 4 is a side elevation of the center and wing section frames, shown broken away, and including a load transfer attachment.

Figure 1:
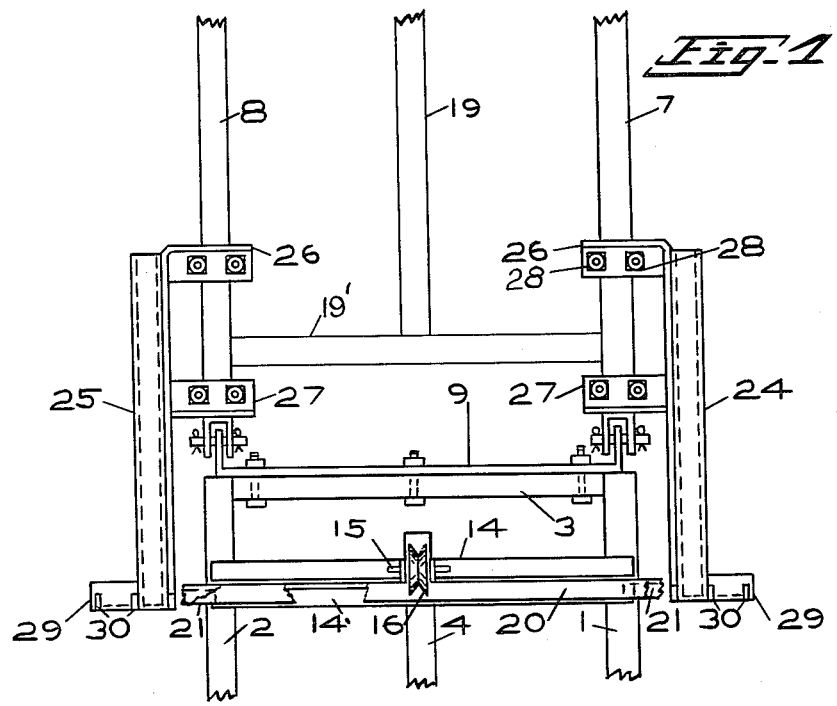
FIG. 1 is a top plan view showing fragments of a center and a wing section pivotally connected, and including the load transfer bars attached on the wing section, shown in part broken away.
Figure 2:
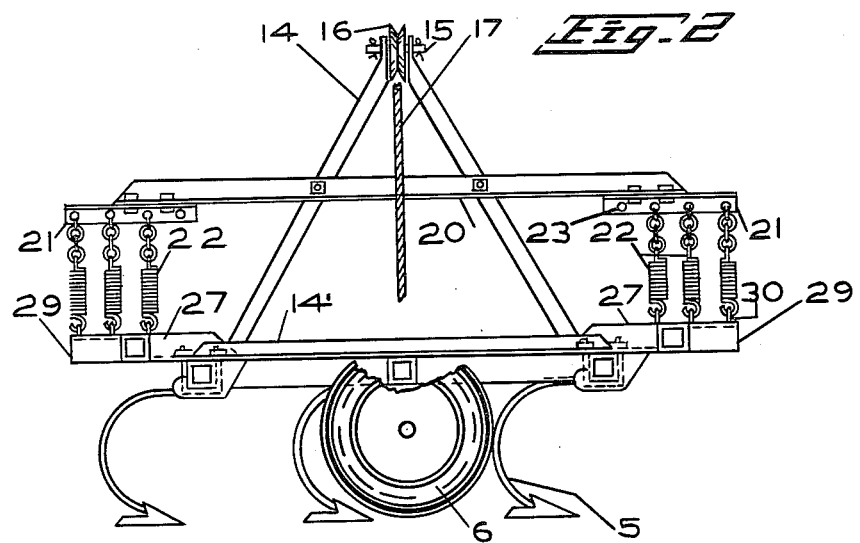
FIG. 2 is an end view of the center section and including the load transfer attachments.

Having reference to the drawings, there is indicated for the present showing a frame for the center section of the cultivator, including front and rear frame bars 1 and 2, and a connecting bar 3, and also including a center frame bar 4, attached to which would be the cultivating elements 5 and the frame supporting wheels, as at 6, all of which in various forms are common in the art.

To the center section is pivoted a wing section at each end, only one of which is included in the drawings, since both wing sections and their attachments to the center section and the application of load transfer bars to the sections would be the same for both. This wing section includes front and rear frame bars 7 and 8, and on the center section is attached a coupling plate 9 by bolts 10, this plate having end lugs 11 engageable by pins 12 carried in U couplings 13 on the wing section frame bars.

In the center section is mounted a pair of uprights 14, fixed, as by welding, to the frame bars 1 and 2. These uprights converge upward and are connected by a pin 15 on which is a pulley wheel 16 with a stabilizing cable 17 trained over the pulley and attached at one end, as by a pin and lugs indicated at 18, to the center frame bar 4 of the center section, and the cable would be similarly attached to a frame bar 19 of the wing section that attaches to a frame cross bar 19', such an arrangement being in common use on cultivators of this character.

On the uprights 14 is carried a spring suspension bar 20 to which are attached plates 21 at the ends, each suspending a series of springs 22 engaged in openings 23 in the plates 21. While it is convenient to mount the bar 20 on the uprights 14, it could be attached on independently mounted uprights on the center section.

On the wing section side bars 7 and 8 are mounted load transfer bars 24 and 25, each of which are attached by end and intermediate bracket arms 26 and 27 attached on the frame bars by U clamps 28. These transfer bars have spring attachment bars 29 at their forward ends extending below and aligned with the spring suspension plates 21 and have each a series of lugs 30 with which the lower ends of the springs 22 are engaged.

In the use of the device, movement of the center section of the cultivator below the level of the wing section tilts the wing section downward at its inner end, this resulting from the pivotal coupling of the wing section frame bars 7 and 8 to the coupling plate 9. This correspondingly tilts the transfer bars 24 and 25 that are attached by the bars 29 to the springs 22. The ends of the transfer bars 24 and 25 project outwardly of the frame bars 7 and 8, and these ends move through a much greater arc than the inner ends of the frame bars 7 and 8. The load transfer bars 24 and 25 are anchored at the ends to the spring suspension bar 20 by the springs 22, which while cushioning the tilting movement of the wing section also strongly oppose it, so that excessive downward movement of the center section is prevented and the excess load is carried by the wing sections, this having reference to a three section assembly.

This keeps the cultivating elements of the center section from penetrating too deeply by transferring the load to the wing sections. The result is even tillage across the full width of the cultivator regardless of ground conditions, and the draft required to pull the implement is very considerably reduced, and by this a larger implement may be drawn with the same power it takes for a smaller one that is not equipped with load transfer means.

While the showing herein directly refers to the use of springs, it is to be understood that this is intended as illustrative and not limiting, as for example hydraulic means could be used, but at greater cost. The number and strength of the springs would be dependent on load conditions, the number shown being suitable in most cases. Also, while the device is shown for use on a three section assembly, it would be equally applicable on any number of multiple sections.

What I claim and wish to secure by Letters Patent is:

In a wheel supported cultivator having a center section and a wing section in line abreast pivotally connected to the center section, uprights on the center section, a spring suspension bar carried by the uprights extending in the line of travel of the cultivator, a pair of load transfer bars, means attaching said bars forwardly and rearwardly on the wing section projecting inwardly of the pivotal connections between the sections, a series of coiled springs for each load transfer bar, means attaching said springs to the end portions of the spring suspension bar, and a spring attachment bar transversely carried by the inwardly projecting end portions of each of the load transfer bars, said springs engaging said spring attachment bars tensionably by downward movement of the center section in relation to the wing section.

References Cited in the file of this patent
UNITED STATES PATENTS

| | | |
|---|---|---|
| 1,831,576 | Petersen | Nov. 10, 1931 |
| 2,298,161 | Robinson | Oct. 6, 1942 |
| 2,498,888 | Hyland et al. | Feb. 28, 1950 |